(12) United States Patent
Arai et al.

(10) Patent No.: US 9,945,707 B2
(45) Date of Patent: Apr. 17, 2018

(54) FLOW SENSOR AND METHOD FOR PRODUCING RESIN STRUCTURE

(71) Applicant: Hitachi Automotive Systems, Ltd., Hitachinaka-shi, Ibaraki (JP)

(72) Inventors: Satoshi Arai, Tokyo (JP); Shigeharu Tsunoda, Tokyo (JP); Shinobu Tashiro, Hitachinaka (JP); Akira Uenodan, Hitachinaka (JP); Shinya Igarashi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 107 days.

(21) Appl. No.: 14/784,224

(22) PCT Filed: Feb. 7, 2014

(86) PCT No.: PCT/JP2014/052833
§ 371 (c)(1),
(2) Date: Oct. 13, 2015

(87) PCT Pub. No.: WO2014/174872
PCT Pub. Date: Oct. 30, 2014

(65) Prior Publication Data
US 2016/0061642 A1    Mar. 3, 2016

(30) Foreign Application Priority Data
Apr. 26, 2013 (JP) .................. 2013-093566

(51) Int. Cl.
*G01F 1/684* (2006.01)
*G01F 15/14* (2006.01)
(Continued)

(52) U.S. Cl.
CPC .......... *G01F 15/14* (2013.01); *B29C 65/1635* (2013.01); *B29C 65/1677* (2013.01);
(Continued)

(58) Field of Classification Search
CPC .......... G01F 1/68; G01F 1/684; G01F 1/6842; G01F 15/14; B29C 65/1635; B29C 66/73118; B29C 66/73776
See application file for complete search history.

(56) References Cited

U.S. PATENT DOCUMENTS 7,396,428 B2    7/2008  Matsushima et al.
8,052,830 B2 *  11/2011 Sakata ................ B29C 65/1635
                                                156/272.2
(Continued)

FOREIGN PATENT DOCUMENTS

EP     2 428 778 A1    3/2012
JP     11-258019 A     9/1999
(Continued)

OTHER PUBLICATIONS

International Search Report (PCT/IAS/210) issued in PCT Application No. PCT/JP2014/052833 dated May 27, 2014, with English translation (four (4) pages).
(Continued)

*Primary Examiner* — Justin Olamit
(74) *Attorney, Agent, or Firm* — Crowell & Moring LLP

(57) ABSTRACT

The purpose of the present invention is to provide a flow sensor that makes it possible to detect temperature abnormalities that the flow sensor has been exposed to and the time history of the flow sensor in a high-temperature environment from an externally visible cover material and that uses a cover material for which the laser welding quality can be guaranteed through visual inspection when the sensor is delivered as a product and even if the sensor is used in an abnormal state. A flow sensor provided with a housing, a cover, a circuit chamber that houses a wiring portion sealed between the housing and the cover, and an auxiliary passage through which the liquid to be sensed flows, wherein: a joint portion formed on the housing and a joint portion formed on
(Continued)

the inner surface of the cover are joined together through the laser welding; the main material of the cover is a crystalline resin; the cover includes an amorphous alloy; and the cover is made to have a natural color.

15 Claims, 16 Drawing Sheets

(51) Int. Cl.
    *G01F 15/00*     (2006.01)
    *B29C 65/00*     (2006.01)
    *B29C 65/16*     (2006.01)
    *B29L 31/34*     (2006.01)

(52) U.S. Cl.
    CPC .......... *B29C 66/124* (2013.01); *B29C 66/242* (2013.01); *B29C 66/244* (2013.01); *B29C 66/53462* (2013.01); *B29C 66/7332* (2013.01); *B29C 66/7392* (2013.01); *B29C 66/73117* (2013.01); *B29C 66/73118* (2013.01); *B29C 66/73161* (2013.01); *B29C 66/73771* (2013.01); *B29C 66/73775* (2013.01); *B29C 66/73776* (2013.01); *B29C 66/73921* (2013.01); *G01F 1/6842* (2013.01); *G01F 15/006* (2013.01); *B29C 65/1616* (2013.01); *B29C 65/1661* (2013.01); *B29C 66/71* (2013.01); *B29L 2031/3481* (2013.01)

(56) References Cited

U.S. PATENT DOCUMENTS

| | | | | |
|---|---|---|---|---|
| 8,193,264 B2 * | 6/2012 | Kumazawa | ............. | C08L 67/00 524/243 |
| 2005/0165176 A1 | 7/2005 | Matsushima et al. | | |
| 2008/0254242 A1 | 10/2008 | Asada et al. | | |
| 2008/0261065 A1 | 10/2008 | Fujimoto et al. | | |
| 2010/0086761 A1 | 4/2010 | Okuda | | |
| 2011/0256406 A1 * | 10/2011 | Farrell | ................ | B29C 65/1616 428/412 |
| 2011/0296904 A1 | 12/2011 | Tagawa et al. | | |
| 2012/0060599 A1 * | 3/2012 | Morino | ..................... | G01F 5/00 73/204.11 |

FOREIGN PATENT DOCUMENTS

| | | |
|---|---|---|
| JP | 2003-292752 A | 10/2003 |
| JP | 2004-358803 A | 12/2004 |
| JP | 2007-210165 A | 8/2007 |
| JP | 2008-260161 A | 10/2008 |
| JP | 2008-265163 A | 11/2008 |
| JP | 2009-56722 A | 3/2009 |
| JP | 2009-132861 A | 6/2009 |
| JP | 2010-90234 A | 4/2010 |
| JP | 2011-252796 A | 12/2011 |
| WO | WO 03/085046 A1 | 10/2003 |

OTHER PUBLICATIONS

Extended European Search Report issued in counterpart European Application No. 14787725.2 dated Oct. 4, 2016 (11 pages).
"Eastman Eastar DN007 PCTG Copolyester", MatWeb Material Property data, URL: http://www.matweb.com/search/DataSheet.aspx?MatGUID=0c6b3b2d0e7a4a8d95d14fa8c6b28ce9&ckck=, Sep. 23, 2016.

* cited by examiner

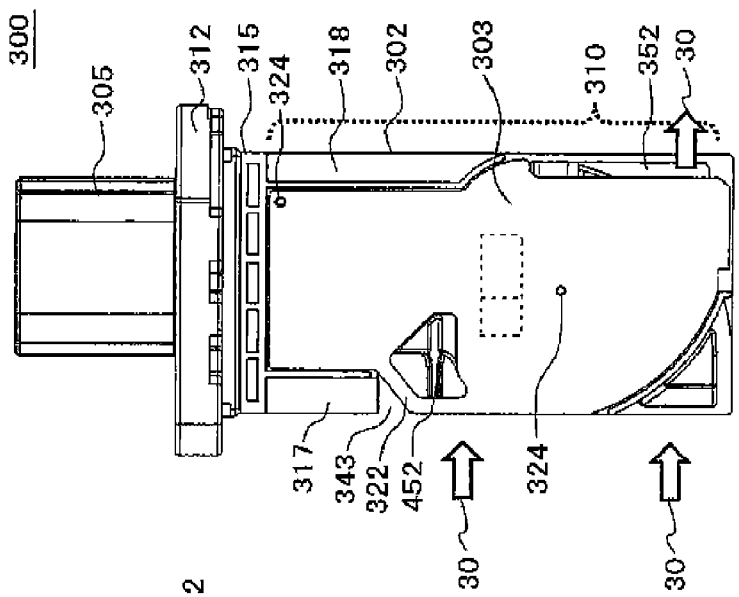
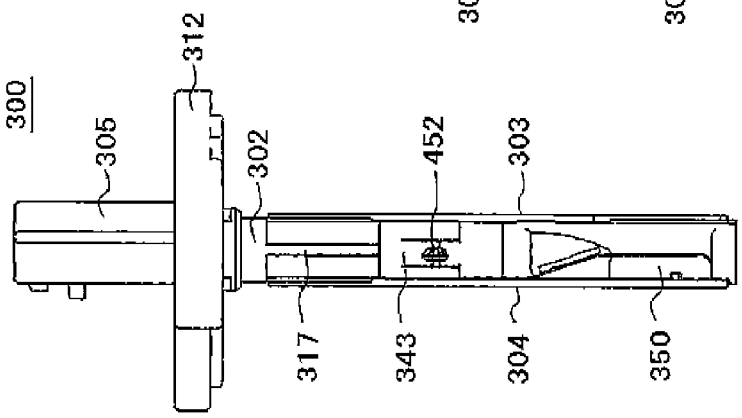
Fig. 2A
Fig. 2B

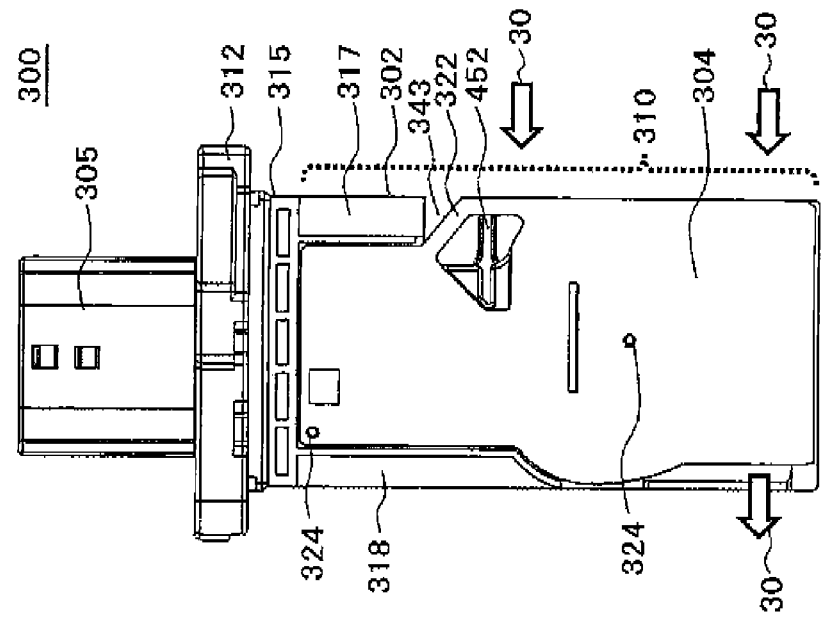
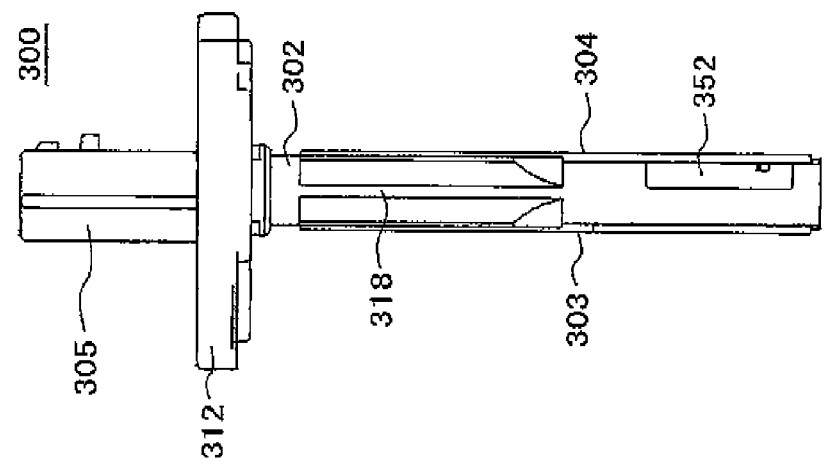

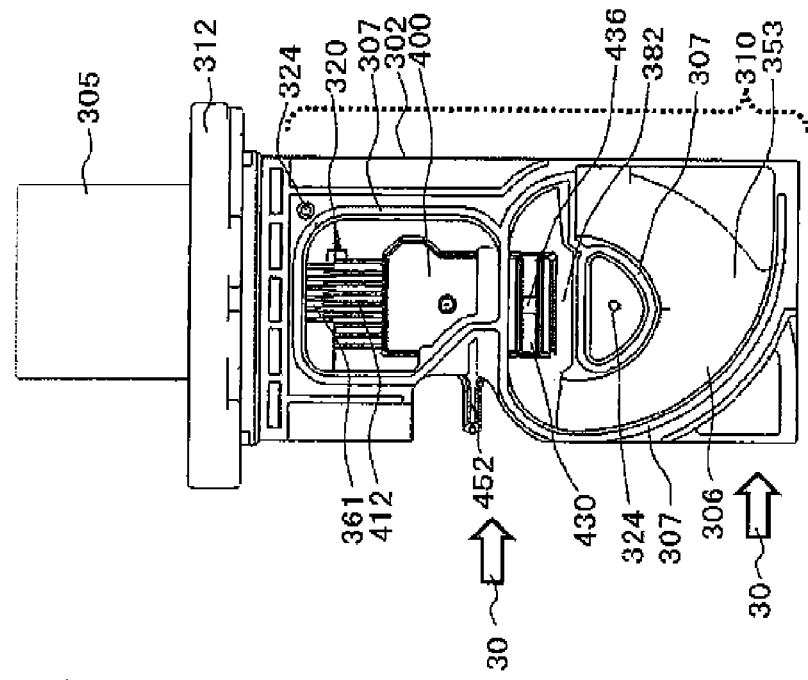
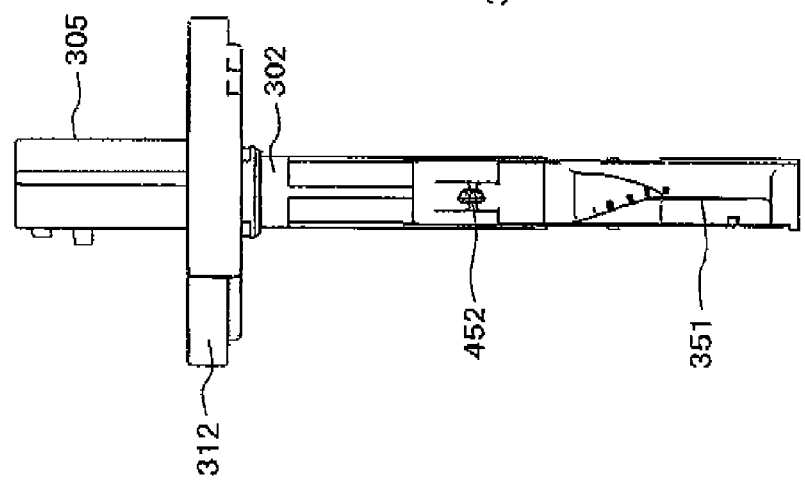

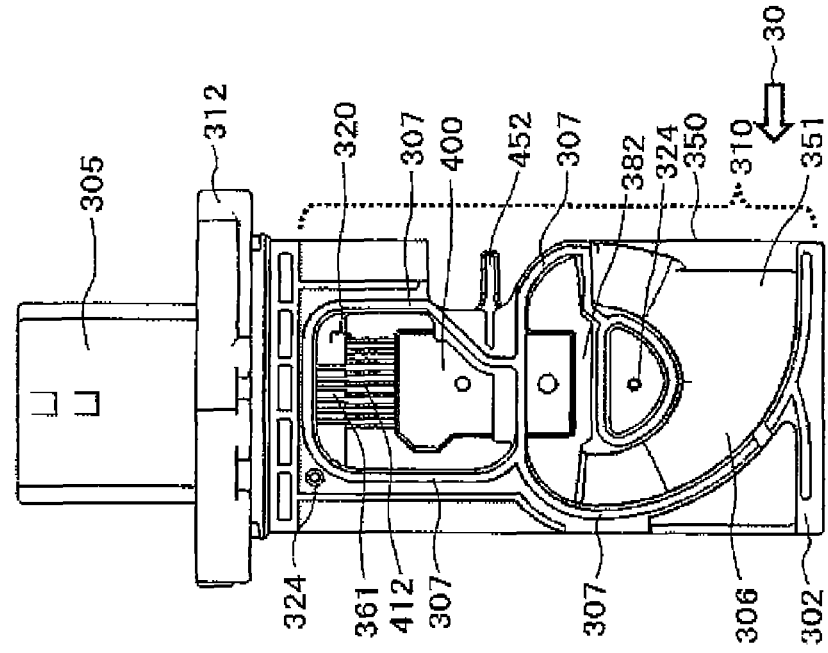
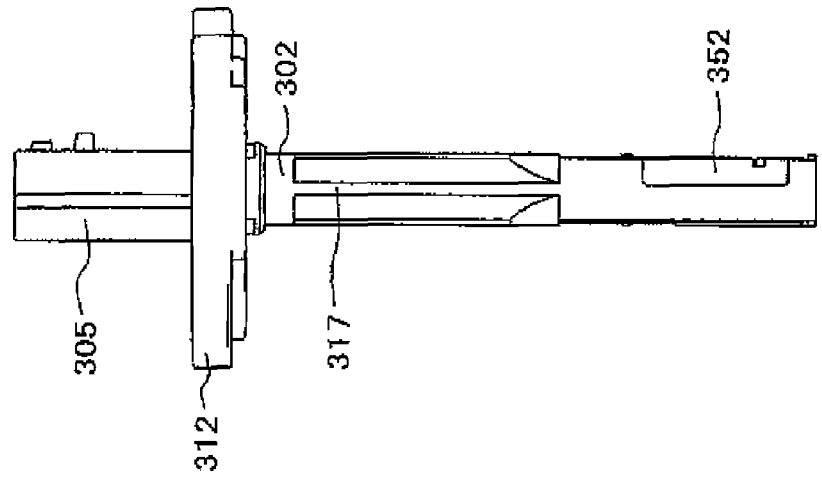

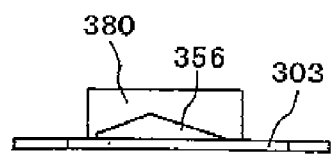
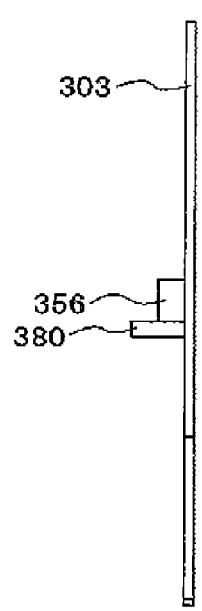
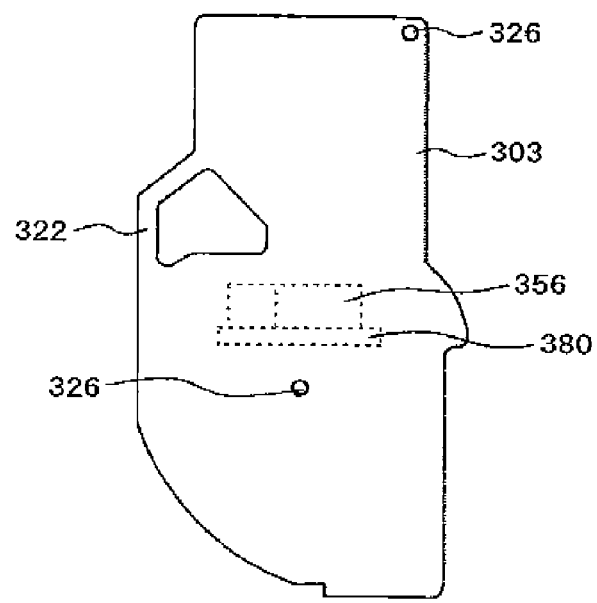

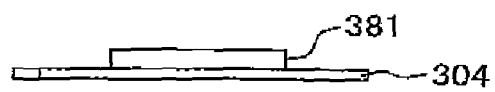
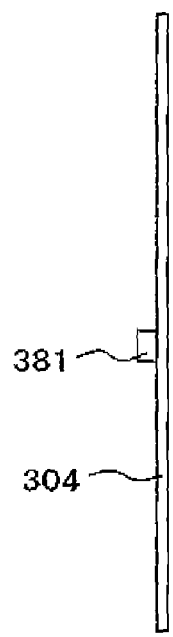
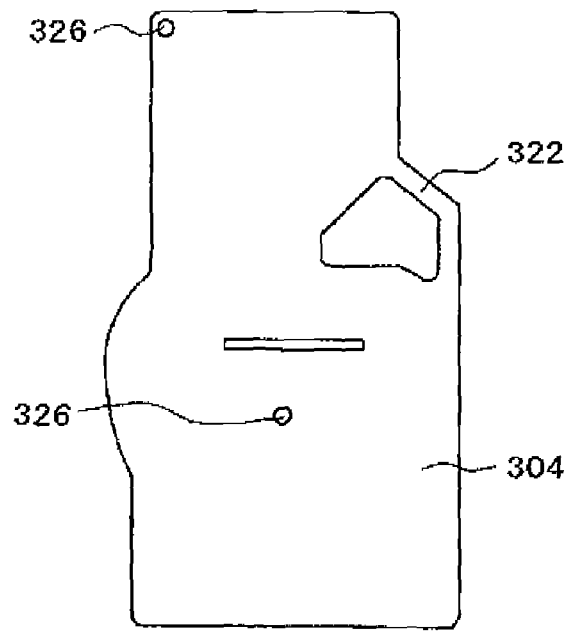

FLOW SENSOR AND METHOD FOR PRODUCING RESIN STRUCTURE

TECHNICAL FIELD

The present invention relates to a flow sensor constructed of a housing and a cover formed from a resin material suitable for laser welding. The present invention also relates to a method for producing a resin structure.

BACKGROUND ART

A thermal flow sensor that measures the flow rate of a gas includes a flow rate detector to measure the flow rate and is configured to measure the flow rate of the gas by allowing thermal conduction between the flow rate detector and the gas to be measured. The flow rate measured by the thermal flow sensor is widely used as an important control parameter of various devices. The thermal flow sensor is characterized in that when compared with other types of flow sensors, the flow rate of a gas can be measured with relatively high accuracy, but in recent years, further improvements of measurement accuracy of the gas flow rate are desired. In vehicles mounted with an internal combustion engine, for example, requirements for fuel saving and requirements for exhaust gas purification are high. To meet such requirements, measurements of an intake air flow as a principal parameter of the internal combustion engine with high accuracy are demanded. A thermal flow sensor that measures an intake air flow introduced into an internal combustion engine includes a sub-passage that takes in a portion of the intake air flow and a flow rate detector arranged in the sub-passage and measures the state of a measured gas flowing through the sub-passage by heat being conducted to the measured gas by the flow rate detector to output an electric signal representing the intake air flow introduced into the internal combustion engine. Such a technology is disclosed by, for example, JP-A-2011-252796 (Patent Literature 1).

Also, a technology to weld a housing and a cover by using laser is disclosed by, for example, JP-A-2007-210165 (Patent Literature 2). Also, as an inspection method of a laser welded portion, a method of determining welding in an expanded state of the welded portion by providing an opening on a transparent resin side is disclosed by, for example, JP-A-2009-056722 (Patent Literature 3). Natural materials containing no carbon material originating from coloring are frequently used for laser welding and depending on the material of resin material or the usage environment, discoloring may occur over time and the appearance may also be important depending on the type of product. Thus, in the Munsell color system, if the lightness is V, the chroma is C, and the hue when a color circle is divided into one hundred portions and a hue 10RP is set as "0" or "100" is H, discoloring over time can be blocked by tinting in color satisfying relationships of "$V \leq 0.229H+3.714$, $V \leq -0.8H+24$, $V \geq 3$" and "$C \leq -0.075H2+1.936H+1.267$, $C \geq 2$", which is disclosed by JP-A-2010-090234 (Patent Literature 4).

CITATION LIST

Patent Literatures

PATENT LITERATURE 1: JP-A-2011-252796
PATENT LITERATURE 2: JP-A-2007-210165
PATENT LITERATURE 3: JP-A-2009-056722
PATENT LITERATURE 4: JP-A-2010-090234

SUMMARY OF INVENTION

Technical Problem

A flow sensor includes a flow rate detector and a temperature detector and these detectors are arranged on a housing (cabinet). In addition, various electronic components are mounted inside a circuit chamber of the housing and sealing is needed to prevent short-circuits and corrosion of wiring portions. Thus, a method of sealing and fixing the housing and a cover using a plurality of adhesives is normally used for the purpose of sealing. Many curable types of adhesives are known, but in consideration of reliability for the use of vehicles, heat-hardening adhesives are mainly used. However, when a heat-hardening adhesive is used, a time of 10 min or longer is needed for heat hardening, posing a problem of low productivity. In addition, a large quantity of adhesive is used for sealing, also posing a problem of higher costs. Further, an unnecessary area is needed for control of a protruding adhesive, constraining the flexibility of design. Moreover, difficulty of controlling a suitable amount of adhesive to be filled to seal electronic components poses a challenge. As a means for solving such problems, as mentioned in Patent Literature 2, the laser welding method capable of directly joining the cover and the housing with accuracy without damaging electronic components can be cited.

For laser welding, when an absorbent resin is melted to weld to a transmission resin, the transmission resin is required to have a certain transmittance or higher for a light source of the wavelength of 800 nm or more used for laser welding to improve productivity or inhibit poor carbonization on the surface. In addition, the method of directly observing a welded portion in visual inspection is considered to the most accurate method as a method of determining a laser welding state. However, challenges posed include necessity of a high transmittance in the visible light in a lower wavelength region than the wavelength of 800 nm or more of the light source used for laser welding. In addition, if the method described in Patent Literature 3 is used as an inspection method other than the visual inspection, a large amount of pyrolytic components (gas) is generated from the portion and pressing materials become dirty, leading to constant cleaning and substantially lower productivity and making the adoption thereof difficult.

It is known that when an internal combustion engine control system of a vehicle into which a flow sensor is incorporated operates normally, the service temperature is in many cases 100° C. or less as an actual usage environment of the flow sensor itself and the flow sensor is not used for a long time at temperature exceeding 100° C. However, if the internal combustion engine control system fails somewhere in the system, the flow sensor itself may be exposed to a high temperature for a long time and it may become difficult to guarantee the quality of the flow sensor alone. A cover of resin material is used for the flow sensor and the resin material as such may be discolored over time. In contrast, Patent Literature 4 describes coloring before product shipment so as to block discoloring, but the flow sensor is used in an internal combustion engine control system and as long as mechanical characteristics of the resin is not significantly degraded, the change of appearance itself due to discoloring of the resin poses no problem.

The present inventors found that a history of the actual usage environment of a flow sensor can be determined by using discoloring of a resin cover material.

From the above, an object of the present invention is to provide a flow sensor using, when selecting a cover material on the outer circumference of a flow sensor, the cover material allowing to recognize an abnormal temperature for the flow sensor in a high temperature environment and a time history based on discoloring of the cover material and capable of guaranteeing laser welding quality by visual inspection when the product is shipped or even after the product is used in an abnormal state.

Solution to Problem

To solve the above challenge, for example, the configuration described in CLAIMS is adopted. The present application includes a plurality of solutions to the problems, and examples thereof include configuring a flow sensor including a sub-passage constituting a measurement channel by taking in a measured fluid from an opening, a flow rate detector arranged inside the sub-passage to measure a flow rate of the measured fluid, a housing isolated from the sub-passage in a circuit chamber to house electronic components that drive the flow rate detector, and resin cover joined to the housing to airtightly seal the sub-passage and the circuit chamber from an outside air, so that a joining portion formed on the housing and a joining portion formed on an inner surface of the cover are joined by laser welding, and a main material of the cover is a crystalline resin and contains at least one non-crystalline alloy material and the cover has a natural color.

A resin material of a region corresponding to the joining portion of the cover has an average transmittance of 35% or more for light of a wavelength of 450 nm to 1100 nm.

A color of the resin material of the region corresponding to the joining portion of the cover to the housing and the neighboring portion satisfies lightness $L^*<75$ and chroma $C^*<10$ in an $L^*a^*b$ color system.

A glass transition temperature of the alloy material contained in the resin material of the cover is 80° C. to 120° C.

Also in the present invention, to solve the above challenge, a method for producing a resin structure includes positioning a joining portion formed on an inner surface of a cover made of resin opposite to a joining portion formed on a housing made of resin and placing the cover on the housing, welding the joining portion of the housing and the joining portion of the cover by applying pressure such that the joining portion of the housing and the joining portion of the cover are brought into close contact and irradiating the joining portions with laser through the cover, and carrying out visual inspection of a state of a welded portion through the cover, wherein the cover is formed by using a crystalline thermoplastic resin as a main material and containing by 10% to 30% an alloy material of a non-crystalline resin whose glass transition temperature is 80° C. to 120° C.

Advantageous Effects of Invention

By adopting the present invention, an abnormal temperature and a time history of a flow sensor can be grasped from the appearance of a cover material. Further, visual inspection of welding quality after welding and an actual usage environment can be carried out. Therefore, a flow sensor that detects an abnormal temperature and a time history and realizes high quality capable of guaranteeing quality of laser welding and lower costs in the actual usage environment can be provided.

BRIEF DESCRIPTION OF DRAWINGS

FIG. 2 is a diagram showing the appearance of the flow sensor, FIG. 2A is a left side view, and FIG. 2B is a front view.

FIG. 3 is a diagram showing the appearance of the flow sensor, FIG. 3A is a right side view, and FIG. 3B is a rear view.

FIG. 4 is a diagram showing a housing when a cover of the flow sensor is removed, FIG. 4A is a left side view of the housing, and FIG. 4B is a front view of the housing.

FIG. 5 is a diagram showing the housing when the cover of the flow sensor is removed, FIG. 5A is a right side view of the housing, and FIG. 5B is a rear view of the housing.

FIG. 6 is a diagram showing the appearance of a front cover, FIG. 6A is a left side view, FIG. 6B is a front view, and FIG. 6C is a plan view.

FIG. 7 is a diagram showing the appearance of a rear cover, FIG. 7A is a left side view, FIG. 7B is a front view, and FIG. 7C is a plan view.

DESCRIPTION OF EMBODIMENTS

An embodiment described below to carry out the invention solves various challenges desired as an actual product and in particular, solves various challenges desirable for use as a measuring device to measure the intake air flow of vehicles to achieve various effects. One of various challenges solved by the embodiment below is the effect described in ADVANTAGEOUS EFFECTS OF INVENTION. Other various challenges solved by the embodiment below and other various effects achieved by the embodiment below will be mentioned in the description of the embodiment below if recognized to be necessary to describe means for solving challenges of the present invention.

In the embodiment described below, the same reference sign indicates the same component even if drawing numbers are different and achieves the same operation and effect. The description of a component already described may be omitted by attaching only the reference sign.

First Embodiment

Figure 1:
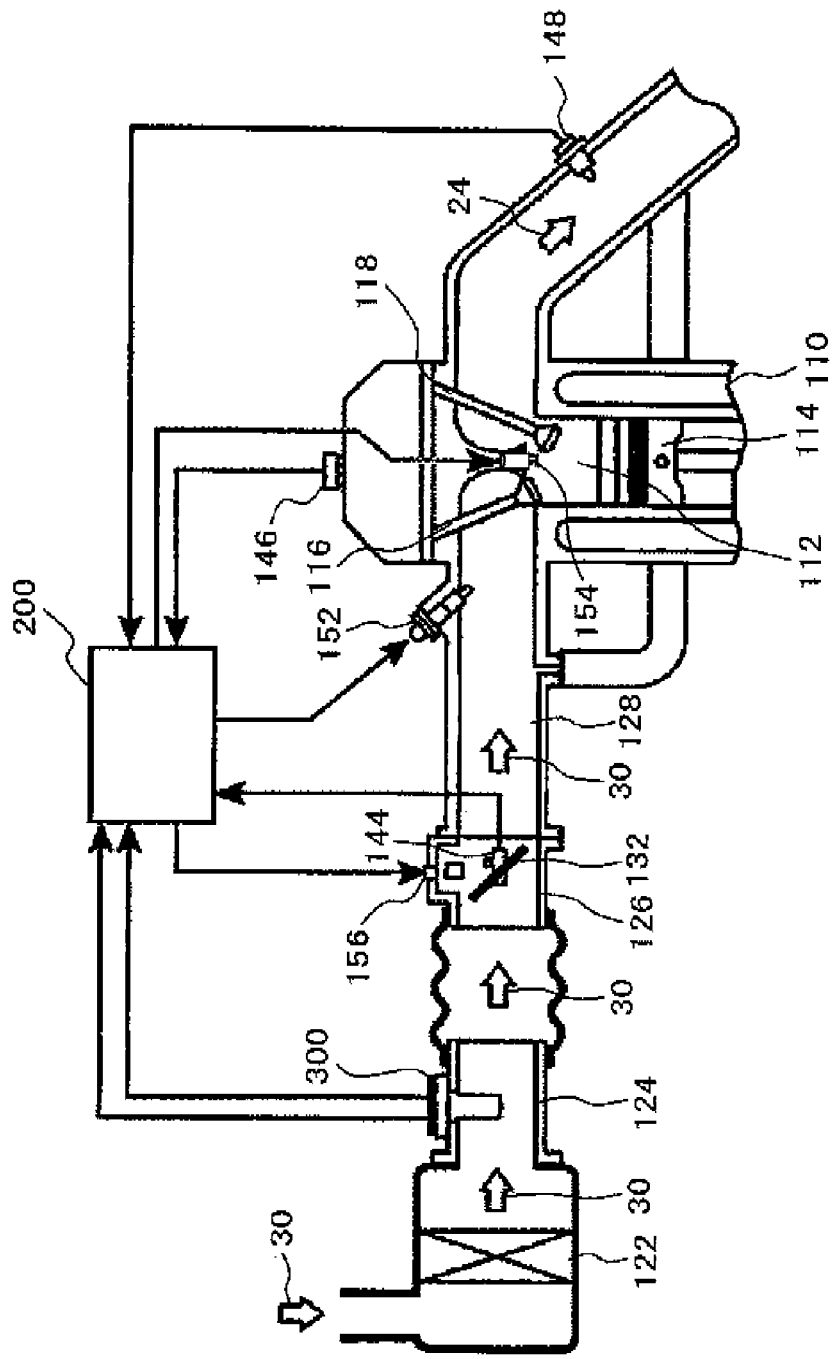
FIG. 1 is a system configuration diagram showing an embodiment in which a flow sensor according to the present invention is used in an internal combustion engine control system.

1. Embodiment in which a Flow Sensor According to the Present Invention is Used in an Internal Combustion Engine Control System FIG. 1 is a system diagram showing an embodiment in which a flow sensor according to the present invention is used in an internal combustion engine control system of an electronic fuel injection system. Based on an operation of an internal combustion engine 110 including an engine cylinder 112 and an engine piston 114, an intake air is taken in from an air cleaner 122 as a measured gas 30 and introduced into a combustion chamber 112 of the engine cylinder via, for example, an intake body, a throttle body 126, and an intake manifold 128 as a main passage 124. The flow rate of the measured gas 30 as an intake air introduced into the combustion chamber is measured by a thermal flow sensor 300 according to the present invention and based on the measured flow rate, fuel is supplied from a fuel injection valve 152 and introduced into the combustion chamber together with the measured gas 30 as an intake air in a fuel-air mixture state. In the present embodiment, the fuel injection valve 152 is provided in an intake port of the internal combustion engine and fuel injected into the intake port forms a fuel-air mixture together with the measured gas 30 as an intake air before being introduced into the combustion chamber for combustion via an intake valve 116 to generate mechanical energy.

In recent years, a system of directly injecting fuel from the fuel injection valve 152 into each combustion chamber by mounting the fuel injection valve 152 in a cylinder head of the internal combustion engine as a system superior in exhaust gas purification and fuel saving in many vehicles. The thermal flow sensor 300 according to the present invention can be used, in addition to the system of injecting fuel in the intake port of the internal combustion engine shown in FIG. 1, similarly for the system of directly injecting fuel into each combustion chamber. Basic concepts of the method of measuring control parameters including the method of using the thermal flow sensor 300 and the method of controlling the internal combustion engine including the fuel supply amount and ignition time are substantially the same for both systems and a system in which fuel is injected into the intake port is shown in FIG. 1 as a representative example of both systems.

The fuel and the air introduced into the combustion chamber form a fuel-air mixture state and are explosively burned by spark ignition of an ignition plug 154 to generate mechanical energy. The gas after the combustion is led from an exhaust valve 118 to an exhaust pipe and then discharged out of the vehicle from the exhaust pipe as an exhaust gas 24. The flow rate of the measured gas 30 as an intake air introduced into the combustion chamber is controlled by a throttle valve 132 whose opening is changed based on the operation of an accelerator pedal. The fuel supply amount is controlled based on the flow rate of the intake air introduced into the combustion chamber. The driver can control mechanical energy generated by the internal combustion engine by controlling the flow rate of the intake air introduced into the combustion chamber by controlling the opening of the throttle valve 132.

The flow rate and the temperature of the measured gas 30 as an intake air flowing through the main passage 124 after being taken in from the air cleaner 122 are measured by the thermal flow sensor 300 and an electric signal representing the flow rate and the temperature of the intake air is input into a control apparatus 200 from the thermal flow sensor 300. Also, the output of a throttle angle sensor 144 measuring the opening of the throttle valve 132 is input into the control apparatus 200 and further, the output of a rotation angle sensor 146 is input into the control apparatus 200 to measure the positions and states of the engine piston 114, the intake valve 116, and the exhaust valve 118 of the internal combustion engine and further the rotational speed of the internal combustion engine. The output of an oxygen sensor 148 is input into the control apparatus 200 to measure the state of a mixing ratio of the fuel amount and the air amount from the state of the exhaust gas 24.

The control apparatus 200 operates the fuel injection amount and the ignition time based on the flow rate of an intake air as an output of the thermal flow sensor 300 and the rotation speed of the internal combustion engine measured based on the output of the rotation angle sensor 146. Based on these operation results, the amount of fuel supplied from the fuel injection valve 152 and the ignition time ignited by the ignition plug 154 are controlled. The fuel injection amount and the ignition time are actually controlled more finely based on the intake air temperature measured by the thermal flow sensor 300, a change state of the throttle angle, a change state of the engine rotational speed, and an air-fuel ratio state measured by the oxygen sensor 148. The control apparatus 200 further controls the rotational speed of the internal combustion engine in an idle operation state by controlling the amount of air bypassing the throttle valve 132 by an idle air control valve 156 in the idle operation state of the internal combustion engine.

2. Configuration of the Thermal Flow Sensor 300

FIGS. 2 and 3 are diagrams showing the appearance of the thermal flow sensor 300 and FIG. 2(A) is a left side view of the thermal flow sensor 300, FIG. 2(B) is a front view thereof, FIG. 3(A) is a right side view thereof, and FIG. 3(B) is a rear view thereof. The thermal flow sensor 300 includes a housing 302, a front cover 303, and a rear cover 304. The housing 302 includes a flange 312 to fix the thermal flow sensor 300 to the intake body as the main passage 124, an external connection unit 305 having an external terminal to electrically connect to an external device, and a measuring unit 310 to measure the flow rate and the like. A sub-passage groove to create a sub-passage is provided inside the measuring unit 310 and further inside the measuring unit 310, a circuit package 400 including a flow rate detector 436 to measure the flow rate of the measured gas 30 flowing through the main passage 124 and a temperature detector 452 to measure the temperature of the measured gas 30 flowing through the main passage 124.

An entrance 350 of the thermal flow sensor 300 is provided on a tip side of the measuring unit 310 extending from the flange 312 toward the center direction of the main passage 124 and thus, a gas flowing through a portion close to the center away from the inner wall surface, instead of near the inner wall surface, can be taken into the sub-passage. Therefore, the thermal flow sensor 300 can measure the flow rate and the temperature of the gas in a portion away from the inner wall surface of the main passage 124 and the degradation of measurement accuracy due to the influence of heat or the like can be inhibited. Measurements are more likely to be affected by the temperature of the main passage 124 near the inner wall surface of the main passage 124 and the measured gas 30 is in a different state from an original state of the gas and so is different from the average state of the main gas in the main passage 124. Particularly, if the main passage 124 is an intake body of the engine, the main passage 124 is affected by heat from the engine and frequently maintained at a high temperature. Therefore, the gas near the inner wall surface of the main passage 124 is frequently higher than the original temperature of the gas flowing inside the main passage 124.

The fluid resistance near the inner wall surface of the main passage 124 is large and the flow velocity there is slower than the average flow velocity of the main passage 124. Thus, if the gas near the inner wall surface of the main passage 124 is taken into the sub-passage as the measured gas 30, a lower measured flow velocity than the average flow velocity in the main passage 124 could lead to a measurement error. In the thermal flow sensor 300 shown in FIGS. 2 and 3, the entrance 350 is provided in a tip portion of the measuring unit 310 in a thin and long shape extending from the flange 312 toward the center of the main passage 124 and thus, a measurement error related to a lower flow velocity near the inner wall surface of the main passage 124 can be reduced. Also in the thermal flow sensor 300 shown in FIGS. 2 and 3, not only the entrance 350 is provided in the tip portion of the measuring unit 310 extending from the flange 312 toward the center of the main passage 124, but also the exit of the sub-passage is provided in the tip portion of the measuring unit 310 so that a measurement error can further be reduced.

The measuring unit 310 of the thermal flow sensor 300 forms a shape extending long from the flange 312 toward the center direction of the main passage 124 and the tip portion thereof is provided with the entrance 350 to take a portion of the measured gas 30 such as an intake air into the sub-passage and also an exit 352 to return the measured gas 30 from the sub-passage to the main passage 124. The measuring unit 310 has a shape long extending along the axis from an outer wall of the main passage 124 toward the center, but the width thereof has, as shown in FIGS. 2(A) and 3(A), a narrow shape. That is, the measuring unit 310 of the thermal flow sensor 300 has a thin width of the side face and the front thereof forms a substantially rectangular shape. Accordingly, the thermal flow sensor 300 can include a sufficiently long sub-passage and limit the fluid resistance to the measured gas 30 to a small value.

FIGS. 4 and 5 show a state of the housing 302 in which the front cover 303 and the rear cover 304 are removed from the thermal flow sensor 300. FIG. 4(A) is a left side view of the housing 302, FIG. 4(B) is a front view of the housing 302, FIG. 5(A) is a right side view of the housing 302, and FIG. 5(B) is a rear view of the housing 302. The housing 302 has a structure in which the measuring unit 310 extends in the center direction of the main passage 124 from the flange 312 and a sub-passage groove 306 to form the sub-passage is provided on the tip side thereof. Because an entrance groove 351 to form the entrance 350 of the sub-passage and an exit groove 353 to form the exit 352 are provided in the tip portion of the housing 302, the gas in a portion away from the inner wall surface of the main passage 124, in other words, the gas flowing through a portion neat the center of the main passage 124 can be taken in as the measured gas 30 from the entrance 350.

When the housing 302 is molded, a connection terminal 412 of the circuit package 400 and an external terminal inner end 361 of the external connection unit 305 are molded. Thus, after the molding, these wires are joined by welding or soldering to form a terminal connection unit 320 before the housing 302 is completed. In the present embodiment, the housing 302 is provided with the sub-passage groove 306 to form the sub-passage and is configured such that the sub-passage is completed by arranging a cover on the front and rear sides of the housing 302 and welding a protruding portion 307 arranged near the sub-passage groove 306 and the front cover 303 and the rear cover 304 by laser. In the present embodiment, the joining portion to the front cover 303 or the rear cover 304 on the housing 302 is the protruding portion 307, but the joining portion does not necessarily need to be formed in a protruding shape and the joining portion may have a plane shape. Also by providing the front cover 303 and the rear cover 304 on both sides of the housing 302, sub-passages on both sides of the housing 302 can be completed.

FIG. 6 is a diagram showing the appearance of the front cover 303, FIG. 6(A) is a left side view thereof, FIG. 6(B) is a front view thereof, and FIG. 6(C) is a plan view thereof. FIG. 7 is a diagram showing the appearance of the rear cover 304, FIG. 7(A) is a left side view thereof, FIG. 7(B) is a front view thereof, and FIG. 7(C) is a plan view thereof. In FIGS. 2 and 3, the front cover 303 and the rear cover 304 are used to create the sub-passage by blocking the sub-passage groove 306 of the housing 302. In addition, a protruding portion 356 is included, which is used to provide a throttle in the channel. In addition, the front cover 303 and the rear cover 304 have a protruding portion 380 and a protruding portion 381 formed thereon and are configured, when welded to the housing 302, to fill a gap of a cavity portion 382 on the tip side of the circuit package 400 shown in FIGS. 4(B) and 5(B) and at the same time, to cover the tip portion of the circuit package 400.

The front cover 303 and the rear cover 304 shown in FIGS. 6 and 7 have a protective portion 322 formed thereon. As shown in FIGS. 2 and 3, the protective portion 322 on the front side provided on the front cover 303 is arranged on a side face on the front side of an entrance 343 into the temperature detector 452 of the measured gas 30 and the protective portion 322 on the rear side provided on the rear cover 304 is arranged on the side face on the rear side of the entrance 343. The temperature detector 452 arranged inside the entrance 343 is protected by the protective portion 322 and mechanical damage of the temperature detector 452 caused by collision of the temperature detector 452 with something during production or while mounted on a vehicle can be prevented.

The protruding portion 356 is provided on the inside surface of the front cover 303 and is arranged, as shown in the example shown in FIG. 6, opposite to a measurement channel surface 430 and has shape long extending in a direction along the axis of the channel of the sub-passage. A throttle is formed in the channel by the measurement channel surface 430 and the protruding portion 356 to reduce eddies in the measured gas 30 and also to act to generate a laminar flow. The front cover 303 and the rear cover 304 are provided with an insertion hole 326 for initial positioning during laser welding. The initial positioning can be performed by using the insertion hole 326 for reference and setting to an ejecting pin 324 formed on the housing 302 shown in FIGS. 4 and 5.

3. Material Composition of the Housing 302 and the Covers 303, 304 and a Laser Welding Structure The thermal flow sensor 300 in the present invention is mainly characterized in that the material composition of the housing 302 and the covers 303, 304 suitable for visual inspection of a welded state of the housing 302 and the covers 303, 304 after laser welding is selected.

For the housing 302 and the covers 303, 304, polybutylene terephthalate (PBT), polyphenylene sulfide (PPS), polyamide 6 (PA6), polyamide 66 (PA66), polyamide 6T (PA6T), and polyamide 9T (PA9T) as heat-resistant crystalline resins are frequently used as main materials.

Laser welding is a method of joining resins by irradiating a joining portion with laser through a light transmission resin while the light transmission resin and a light absorbent resin are put together and melting the other light absorbent resin and then, melting the light transmission resin. Laser having a wavelength of the infrared region of 800 to 1100 nm including the semiconductor laser, YAG laser, and fiber laser is effective in terms of cost as a light source used for laser welding, but laser having different wavelengths may also be used in accordance with the absorption of resin. The intensity distribution of a laser light source can be changed to various intensity distributions by an attached lens such as the Gaussian type, top hat type, and ring type and more uniform welding can be achieved by using the top hat type or ring type. For laser irradiation, the laser light source or a product may physically be moved by a stage for welding or laser light itself may be controlled using a galvanometer mirror for irradiation.

Figure 8:
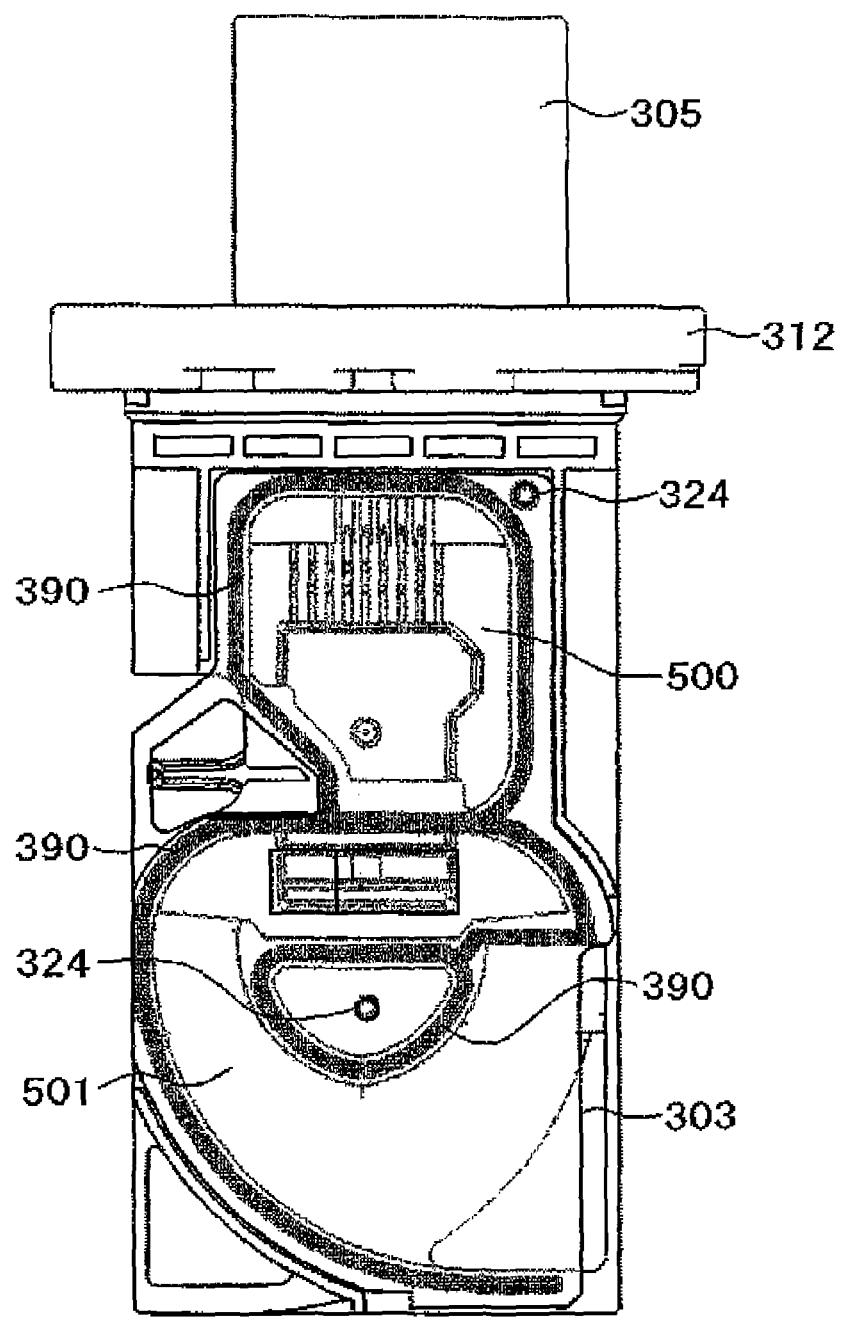
FIG. 8 is a diagram showing a welded portion of the front cover and the housing by laser welding.
Figure 9:
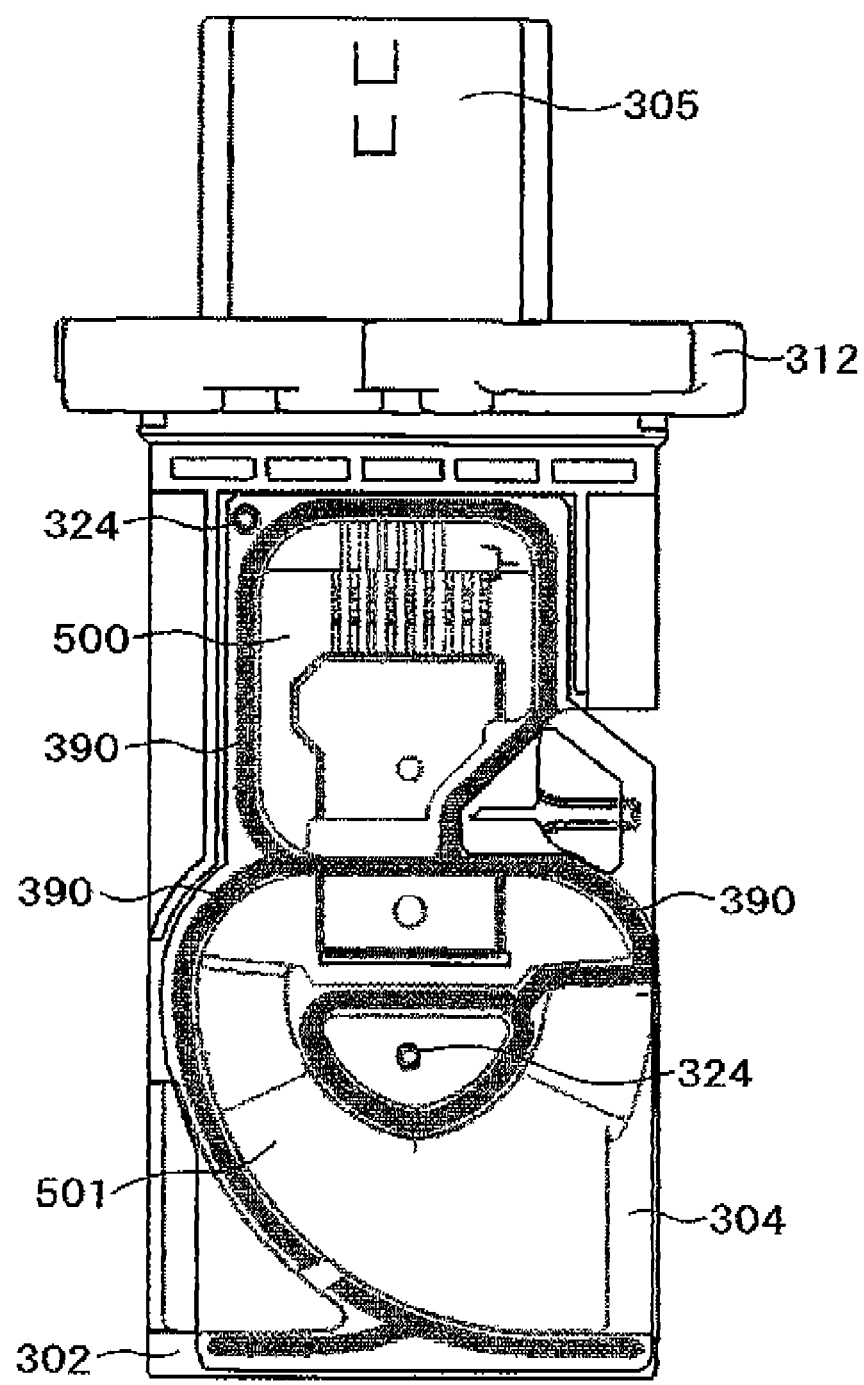
FIG. 9 is a diagram showing a welded portion of the rear cover and the housing by the laser welding.

FIGS. 8 and 9 show an example of a laser welded portion 390 on the housing 302 of the thermal flow sensor 300 according to the present embodiment (representing a diagram viewing the laser welded portion 390 and the inside by seeing through the front cover 303 and the rear cover 304 after laser welding by putting the front cover 303 and the rear cover 304 on the housing 302). First, an overview of laser welding will be provided. First, the housing 302 is set in a predetermined position and positioning adjustments are made on the ejecting pin 324 formed on the housing 302 using the insertion hole 326 formed in the covers 303, 304 for reference to arrange the covers 303, 304 precisely on the housing. In this case, it is desirable to fit the ejecting pin 324 formed on the housing 302 and the insertion hole 326 formed in the covers 303, 304 such that the gap of portions to be laser-welded of the covers and the housing does not become too large. Then, the covers 303, 304 and the housing 302 are pressed by a transparent pressing material such as glass or acrylic resin. The pressing force in this case is desirably 0.1 MPa or more to reduce the gap.

The protruding portion (joining portion) 307 on the housing 302 and the joining portion formed inside the cover are close to each other so as to be almost in contact.

Next, the surroundings of a circuit chamber 500 including the connection terminal 412 are laser-welded while the pressing state is maintained and further laser-welded such that a sub-passage 501 is formed. As the order of laser-irradiation, the sub-passage 501 may first be welded and then the circuit chamber 500. However, the start point and the end point of laser irradiation tend to be unstable and particularly for the circuit chamber, the start point and end point are desirably positioned by shifting from the welded portion to form the circuit chamber 500. Laser irradiation may be repeated a plurality of times and the influence of a gap between the covers 303, 304 and the housing 302 can be reduced by repeating the welding. The circuit chamber and the sub-passage 501 of the thermal flow sensor 300 are formed by performing laser welding according to the above procedure, but in view of productivity and yields of laser welding, a high transmittance of resin materials of the covers 303, 304 is required.

Thus, to improve the transmittance of resin materials of the covers 303, 304, it is effective to add a transparent non-crystalline thermoplastic resin as an alloy material and the color needs to be a natural color. Normally, near infrared laser light is frequently used for laser welding itself and so attention is frequently paid to only the transmittance for near infrared laser light, but when the visual inspection is applied to check the quality of laser welding, it turns out that a high transmittance in the visible light region is also needed. Because an alloy material contained in the covers 303, 304 is close to transparent, a high transmittance in the visible light region is obtained, effectively contributing to improvements of the transmittance in the visible light region.

Thus, a test of whether visual inspection after laser welding can be carried out by using a material obtained by including polystyrene (PS) in a PBT resin by 20% as a laser welding resin material and changing the thickness of the covers 303, 304 before laser welding reveals that the welding width can correctly be recognized by setting the average transmittance in the visible light wavelength region of 450 nm or more to 35%. The test also reveals that by setting the transmittance to 45% or more, up to voids on the order of a few hundred μm remaining in the welded portion can be detected. Therefore, it turns out that the visual inspection can be carried out by setting the average transmittance to 35% or more for visible light of 450 nm or more. This time, a detection system in which a CCD camera is used for detection is used and in such a case, having a high transmittance in the wavelength region of 450 nm to 750 nm is effective in terms of sensitivity of the CCD camera, but detection at a wavelength close to infrared becomes possible by using an infrared CCD camera or the like. In general, a crystalline resin has a higher transmittance with a wavelength closer to infrared and if this relationship holds, the transmittance for the wavelength of laser light needed for laser welding can be said to be a sufficiently unproblematical level.

In addition, as an index other than the transmittance, the lightness $L^*$ and the chroma $C^*=[(a^*)^2+(b^*)^2]^{1/2}$ are measured according to the $L^*a^*b$ color system defined in JISZ8729 to convert object colors into numbers. Verification under the assumption that whether the inspection can be carried out can be determined from the lightness $L^*$ and the chroma $C^*$ of the resin material of the covers 303, 304 reveals that if the relationships of the lightness $L^*<75$ and the chroma $C^*<10$ are satisfied by the color of a portion to be laser-welded, the visual inspection can be carried out.

Figure 10:
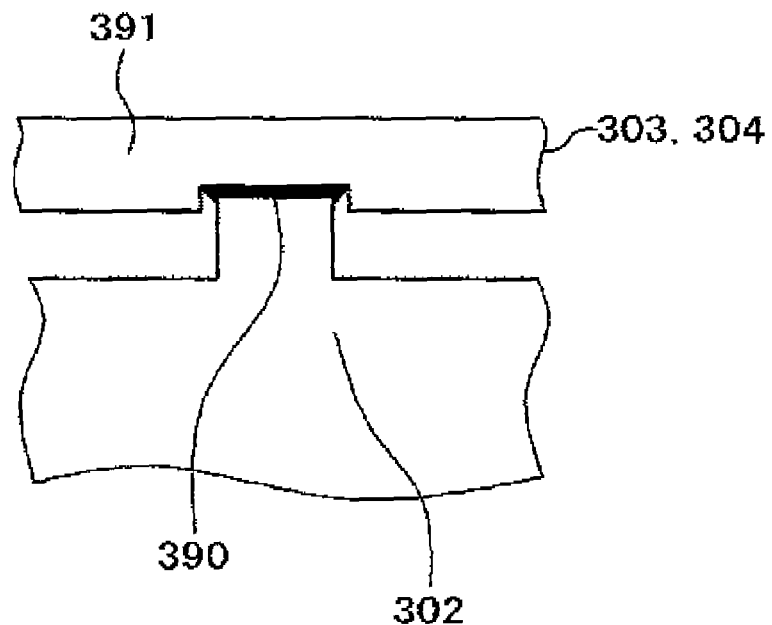
FIG. 10 is an example of a sectional view showing a laser welded structure of the cover and the housing.
Figure 11:
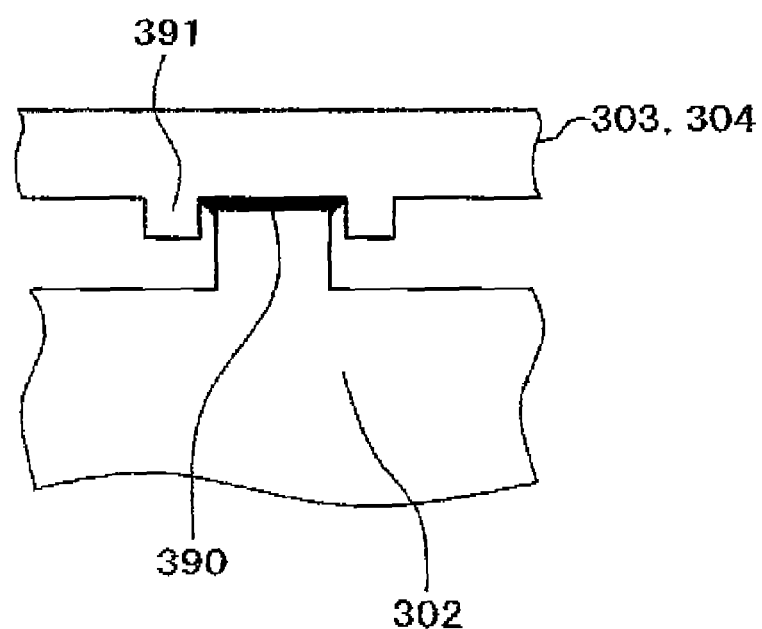
FIG. 11 is an example of the sectional view showing the laser welded structure of the cover and the housing.

It also turns out that the accuracy of inspection is significantly affected in the visual inspection by increasing the difference of contrast between the laser welded portion 390 and other portions than the laser welded portion 390. When, for example, as shown in FIG. 10, the visual inspection of the welded state of the laser welded portion 390 is carried out from above through the covers 303, 304, if the covers 303, 304 in a portion 391 adjacent to the laser welded portion 390 and the housing 302 are in close contact, the portion 391 is detected similarly due to a small contrast difference between the portion 391 and the welded portion 390. As a means for avoiding such circumstances, it is effective to make the transmittance of the covers 303, 304 corresponding to a region of the neighboring portion 391 smaller and the lightness $L^*$ thereof larger than those of the covers 303, 304 corresponding to a region of the portion 390 to be laser-welded and the lightness L*. Thus, as shown in FIGS. 10 and 11, it is effective to increase the contrast difference by lowering the transmittance by making the neighboring portion 391 thicker than the laser welded portion 390 of the covers 303, 304 and increasing the lightness L*.

Figure 12:
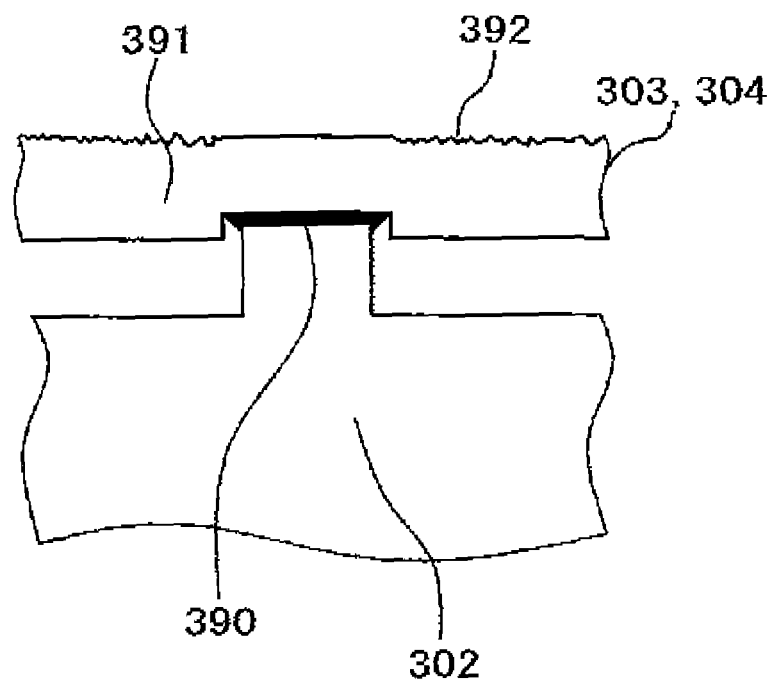
FIG. 12 is an example of the sectional view showing the laser welded structure of the cover and the housing.

Also, as shown in FIG. 12, fine irregularities 392 may be formed on the laser irradiation surface of the covers 303, 304 in the neighboring portion 391 other than the laser welded portion 390. By lowering the transmittance of light by causing scattering through the formation of the fine irregularities 392, a contrast difference between the laser welded portion 390 and the neighboring portion 391. However, if fine irregularities are too large, adhesiveness to the pressing material deteriorates and thus it is desirable to limit the roughness Rz to 5 µm or less. It is also effective to make a gap between the covers 303, 304 and the housing 302 large in a region of the neighboring portion 391 of the laser welded portion 390 between the covers 303, 304 and the housing 302.

In terms of the transmittance, the application of a transparent material can be considered to satisfy the above relationships, but the transparent material is basically a non-crystalline resin and does not have sufficient heat resistance and environmental resistance for use as vehicle components and if the material is close to transparent, no difference of contrast is obtained between the laser welded portion 390 and the color of the housing 302 and therefore, in terms of visual inspectability and necessary contrast, it is effective to have a color of the natural material of a crystalline resin as the main material. However, if an increase in cost can be permitted, the color can be changed from the natural color a little by adding pigment or dye after the transmittance and the color being satisfied. In addition to transparency, colors meeting the above range include black, but if black is adopted, laser welding and visual inspection cannot be combined. From the above, it is desirable to set the thickness of the covers 303, 304 in the laser welded portion 390 to 0.5 mm to 0.8 mm. It is also desirable to set the amount of the non-crystalline alloy material used to improve transparency to 10 to 30%. Even if, for example, molding conditions are appropriate, the transmittance may deteriorate in accordance with the shape of the covers 303, 304 or constraints of the balance with other components. In such a case, the quality may be guaranteed by, in addition to the visual inspection, determining sinking of the laser welded portion 390 based on the height thereof.

4. Method of Evaluating a Usage Environment History of the Flow Sensor

It is known that when a flow sensor is used in the engine room and the internal combustion engine control system operates normally, the service temperature is in many cases 100° C. or less as an actual usage environment of the flow sensor itself and the flow sensor is not used for a long time at temperature exceeding 100° C. However, if the internal combustion engine control system fails somewhere in the system, the flow sensor itself may be exposed to a high temperature for a long time and it may become difficult to guarantee the quality of the flow sensor alone. In such a case, grasping the environment in which the flow sensor is used frequently leads to a solution. A flow sensor according to the present invention assumes the use of the natural color for the material of the covers 303, 304 made of resin and we found using discoloring of the material of the covers 303, 304 of the resin used for the flow sensor as a method of evaluating a usage environment at a high temperature for a long period at low cost without using additional components.

The present invention is characterized in that the main material of the covers 303, 304 used for the flow sensor is a crystalline resin and the natural color containing an alloy material in which the non-crystalline glass transition temperature is 80° C. to 120° C. is used.

Figure 13:
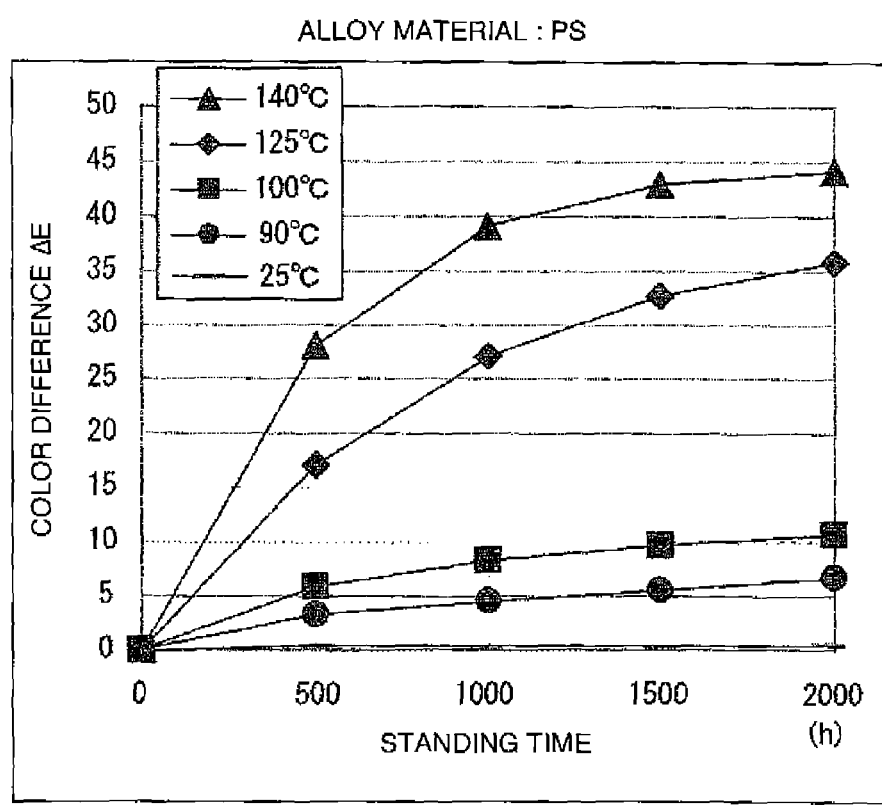
FIG. 13 is a result of evaluating color differences when using the cover of polystyrene from a polybutylene terephthalate resin and an alloy material and left standing for a long time at each temperature.
Figure 14:
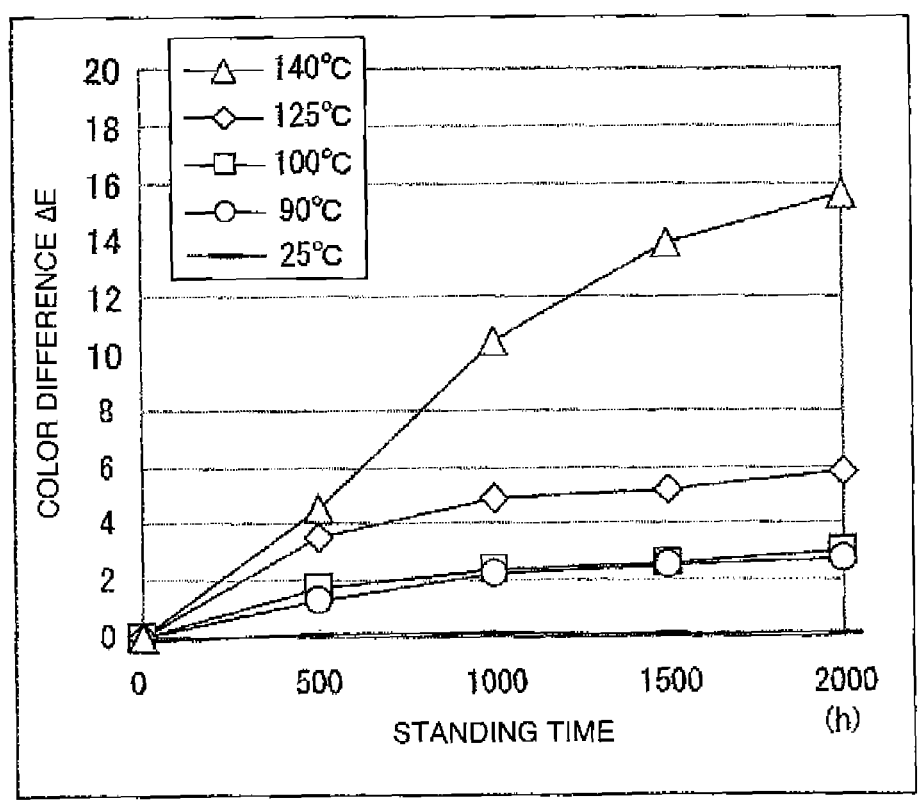
FIG. 14 is a result of evaluating color differences when using the cover of polycarbonate from the polybutylene terephthalate resin and the alloy material and left standing for a long time at each temperature.

Here, discussion results leading to the present invention will be described. Color difference changes when the PBT resin is used as the main material of the covers 303, 304, polystyrene (PS) whose glass transition temperature is about 100° C. or polycarbonate (PC) whose glass transition temperature is about 150° C. is contained by about 20% as an alloy material, and left standing at each temperature are shown in FIGS. 13 and 14. The color difference change is calculated by converting colors of the covers 303, 304 into numbers by a chromatometer conforming to the standard of JISZ8729. A color difference between the initial color of the covers 303, 304 and the color after being left standing is calculated by a color difference $\Delta E=[(\Delta L^*)^2+(\Delta a^*)^2+(\Delta b^*)^2]^{1/2}$ between two colors defined by $\Delta L^*$, $\Delta a^*$, and $\Delta b^*$ as differences of coordinates L*, a*, and b* in the L*a*b color system.

Figure 15:
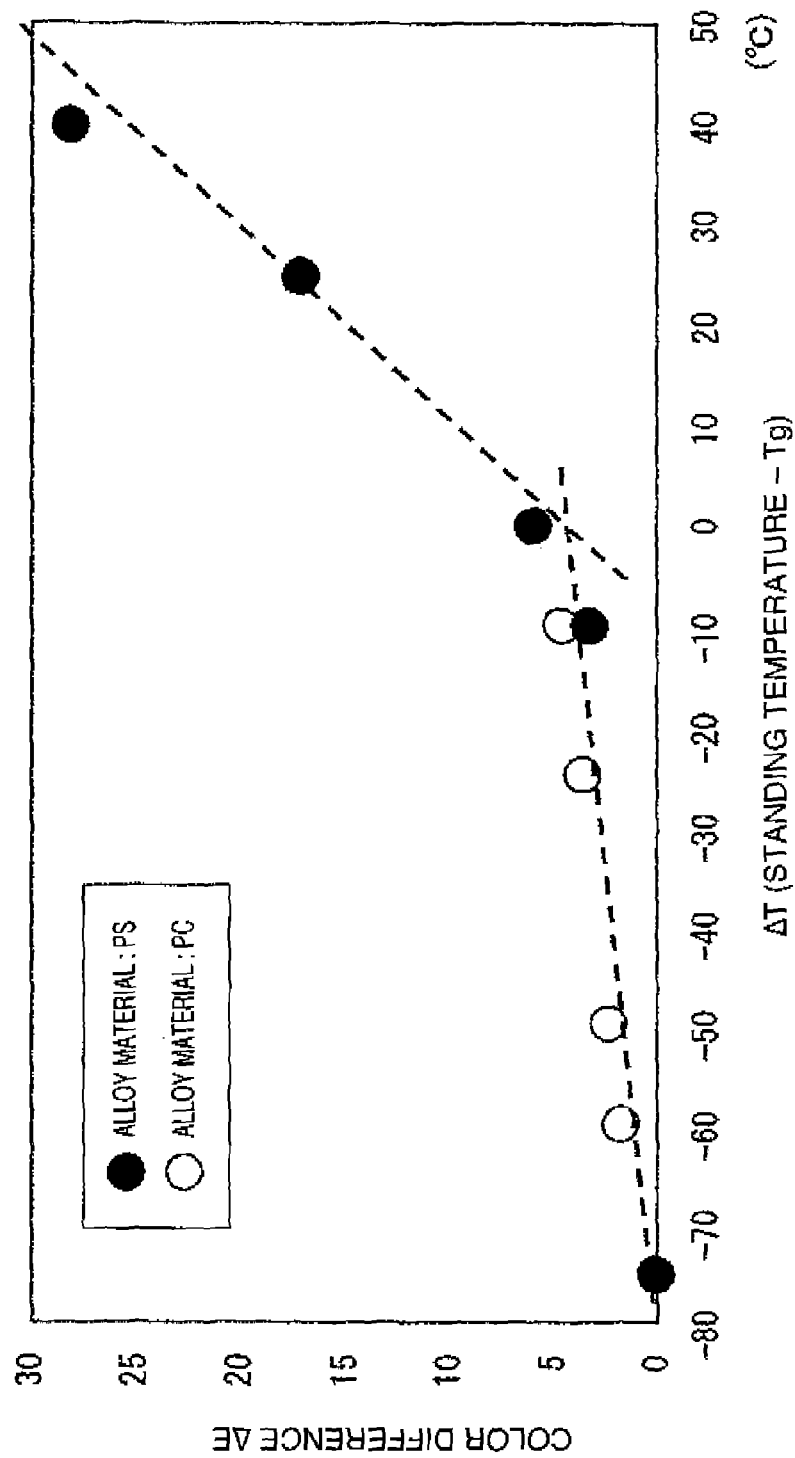
FIG. 15 is a diagram showing a color difference result when using the cover of polystyrene or polycarbonate from the polybutylene terephthalate resin and the alloy material and left standing for 500 h at each temperature.

From the above result, discoloring increases with a rising temperature in each resin and it turns out that the amount of discoloring is decreased by adding PC with a high glass transition temperature. FIG. 15 shows a result of summarizing the relationship between $\Delta T$ (standing temperature–glass transition temperature Tg) when left standing for 500 h and the color difference $\Delta E$. The result newly reveals that when $\Delta T$ is 0, that is, the difference between the standing temperature and the glass transition temperature is larger than 0, discoloring quickly increases.

Figure 16:
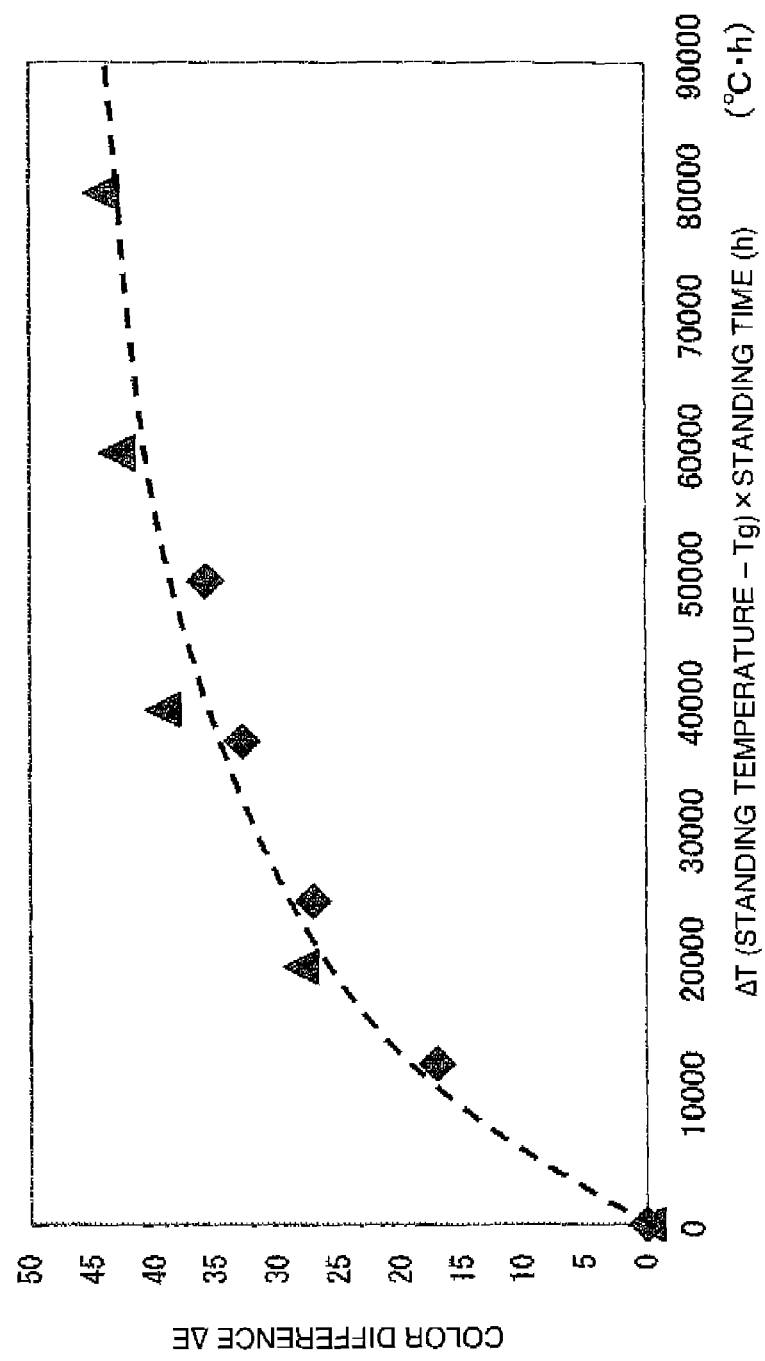
FIG. 16 is a result showing the relationship between ΔT (standing temperature–glass transition temperature of the alloy material)×standing time and color difference when using the cover of polystyrene from the polybutylene terephthalate resin and the alloy material.

Thermoplastic resins including the PBT resin is discolored by oxidation at a high temperature and when $\Delta T$ is smaller than 0, the discoloring is affected by an antioxidant or PBT resin elements more than the alloy material contained. In contrast, it turns out that if the standing temperature is higher than the glass transition temperature of the alloy material as a non-crystalline resin, oxidation of the alloy material itself clearly affects discoloring significantly. If the relationship is summarized in terms of the product of $\Delta T$ and the standing time and discoloring (color difference $\Delta E$), as shown in FIG. 16, the relationship of the standing temperature and time can be estimated from discoloring. Therefore, the usage environment when left standing at an abnormal temperature can be grasped according to the degree of discoloring of the covers 303, 304 in accordance with discoloring of the alloy material contained.

Figure 17:
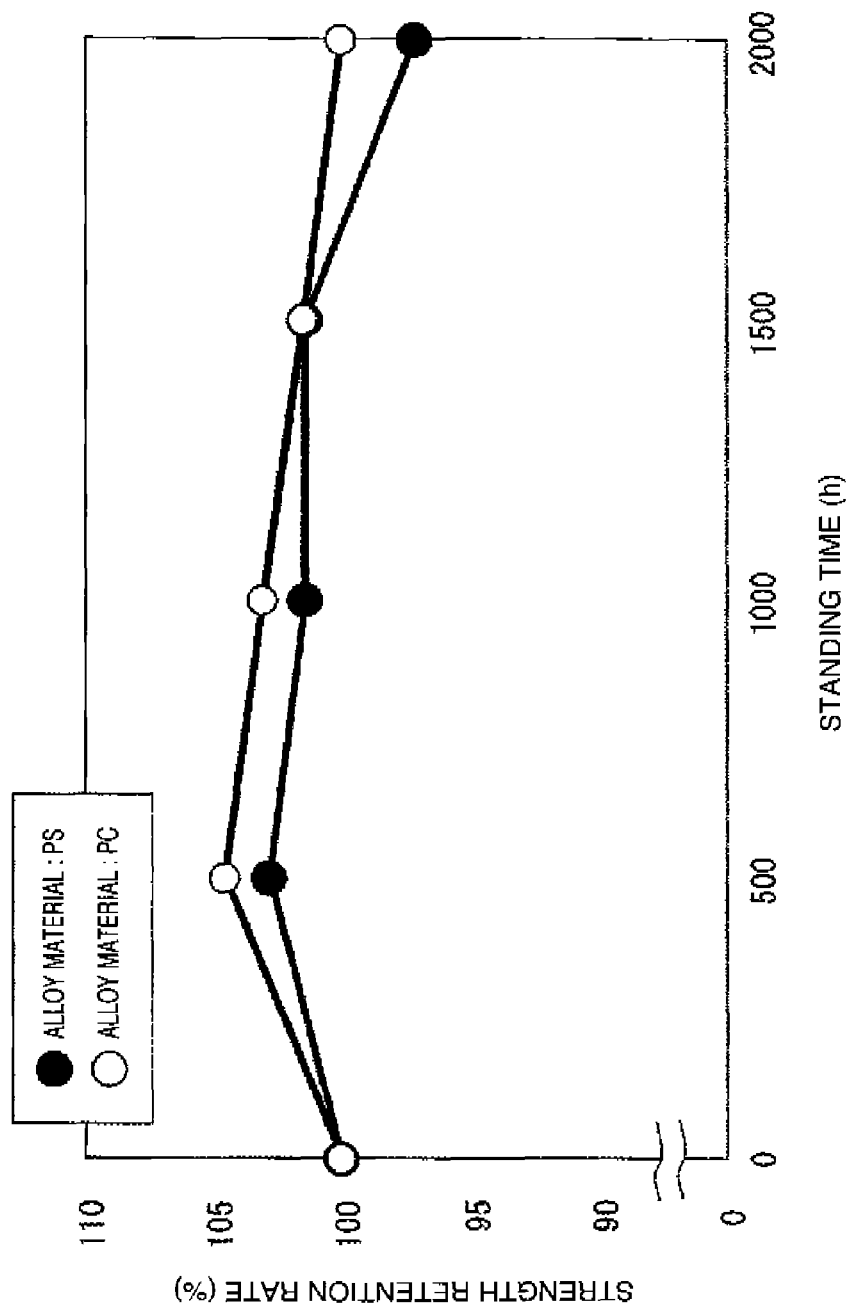
FIG. 17 is a result showing a decreasing rate of flexural strength when using the cover of polystyrene or polycarbonate from the polybutylene terephthalate resin and the alloy material and left standing at 140° C.

On the other hand, the flow sensor is not used at 100° C. or higher for a long time as an actual usage environment, but it is necessary to guarantee the operation at a high temperature like 130° C. for 2000 h. FIG. 17 shows a result of evaluating flexural strength of materials when the standing time is increased to 2000 h at 140° C. using the materials of the covers 303, 304 described above. In FIG. 17, like the above case, a sample containing polystyrene (PS) whose glass transition temperature is about 100° C. or polycarbonate (PC) whose glass transition temperature is about 150° C. by about 20 wt % as an alloy material. As a result, even if polystyrene (PS) whose glass transition temperature is about 100° C. is contained, the flexural strength hardly deteriorates at 140° C. after 2000 h when extreme discoloring occurs, revealing that the material can safely be used for the flow sensor. That is, even if discoloring occurs, the discoloring is caused by oxidation only near the surface of the alloy material as a non-crystalline resin and physical properties are considered not significantly degraded. From the above, in consideration of the fact that the usage environment of the flow sensor is at most 100° C. even if the temperature rises, the glass transition temperature of the non-crystalline resin to be added needs to be between 80° C. and 120° C.

In addition to the tests of leaving the flow sensor standing, various tests of the discoloring at high temperature/high humidity (85° C., 85%) are performed and results thereof show a little lower level of discoloring than that when left standing at high temperature of 90° C. and the influence of humidity is not recognized.

By satisfying conditions of the transmittance and color shown above for the material of the covers 303, 304, even if discoloring occurs, whether large peeling occurs in the welded portion can be determined by visual inspection of the laser welded portion 390. Therefore, by adopting the conditions of the transmittance and color and the configuration of the alloy material, not only the quality before shipment after laser welding, but also the quality of laser welding itself can be guaranteed even if used at an abnormally high temperature for a long time.

The present flow sensor is configured, as shown in FIGS. 2 and 3, to use the front cover 303 and the rear cover 304. Thus, the non-crystalline alloy material contained in the front cover 303 and the rear cover 304 may be changed. Thus, by changing the glass transition temperature of the non-crystalline alloy material contained in the front cover 303 and the rear cover 304, the temperature or the time based on discoloring of the covers 303, 304 can be identified more accurately.

If laser welding is performed while the gap between the covers 303, 304 and the housing 302 is large by laser irradiation, large voids may be generated in the welded portion or an irradiated portion of the covers 303, 304 may be carbonized, leading to poor welding. Particularly in a flow sensor, the covers 303, 304 are thin and priority is given to the transmittance and thus, the rigidity of a joining portion is low and the covers 303, 304 are known to follow the shape of the housing 302. However, if the warping of the housing 302 is large, the occurrence of a portion where the gap becomes large poses a challenge. If the housing 302 integrated with the circuit package 400 and having high rigidity is pressed to the extent that the warping is corrected, problems such as deterioration of characteristics of the flow rate detector 436 made of Si elements and LSI contained in the circuit package 400 and the occurrence of cracks in a portion of the housing 302 are accumulated. Thus, to limit the warping when the material of the housing 302 is molded, the material of the housing 302 is desirably configured to contain a non-crystal alloy. In addition to improvements of dimensional stability after molding, containing an alloy material is also effective in improving impact resistance.

If the housing 302 or the covers 303, 304 are deformed during operation of the flow sensor in a long-term environment, it is known that channel characteristics change and detection variations of the flow rate increase. In the present invention, an alloy material whose glass transition temperature is 80° C. to 120° C. is used for the covers 303, 304 and thus, in a temperature environment of, for example, about 100° C., a decrease of the elastic modulus becomes conspicuous. However, as has been described, the covers 303, 304 and the housing 302 are joined and the influence of the housing 302 having high rigidity on long-term deformation is large. Thus, heat resistance of the alloy material contained in the covers 303, 304 needs to be higher than that of the material of the housing 302 and it is desirable that the relationship of the glass transition temperature of the alloy material contained in the housing 302≥glass transition temperature of the alloy material contained in the covers 303, 304 holds. The same can be said about the elastic modulus and it is desirable that the relationship of the elastic modulus of thermoplastic resin constituting the housing 302≥the elastic modulus of thermoplastic resin constituting the covers 303, 304 holds.

Regarding the covers 303, 304, though the influence is small when compared with the housing 302, it is known that a long-term dimensional change affects characteristic variations. Among others, particularly the cover 303 arranged on the side opposed to the flow rate detector made of Si elements has a more influence than the cover 304 arranged on the opposite side. Thus, while taking the transmittance into account, it is desirable that the relationship of the degree of crystallinity {the ratio of a crystalline portion in a state divided into a crystalline state in which macromolecules are regularly arranged and a non-crystalline state in which macromolecules are present like a clew or entangled and is defined like (degree of crystallinity)=(crystalline region portion)/(sum of the crystalline region portion and the non-crystalline region portion)} of the cover 303>degree of crystallinity of the cover 304 on the rear side holds.

In some cases, the relationship of the glass transition temperature of the alloy material contained in the cover 303 arranged on the side opposite to the flow rate detector made of Si elements>glass transition temperature of the alloy material contained in the cover 304 arranged on the opposite side may hold.

An inorganic substance, for example, glass fiber, glass flakes, or glass in a special shape may be added and a glass material of about 20% to 50% may be added as a means for improving dimensional stability during molding and over a long period. However, the addition of the glass material deteriorates laser transmission of the covers 303, 304 and thus, in view of compatibility with long-term dimensional stability, the glass material contained in the material of the covers 303, 304 may be set to 20% to 30%.

A coloring agent such as carbon black is added to the material of the housing 302 for laser welding and thus, there is no need to consider discoloring, the transmittance, and the color thereof, but the housing 302 needs to have less deformation than the covers 303, 304. From the above, the relationship of the addition ratio of the glass material of thermoplastic resin constituting the housing 302≥addition ratio of the glass material of thermoplastic resin constituting the covers 303, 304 needs to hold.

From the viewpoint of inhibiting long-term deformation, it is known that the degree of crystallinity of crystalline thermoplastic resin decreases and the transmittance thereof increases as the die temperature during molding decreases. Thus, a low die temperature satisfying conditions of the transmittance and color may be applied to the covers 303, 304. On the other hand, dimensional stability in a usage environment increases with an increasing degree of crystallinity and thus, a higher degree of crystallinity is desirable for the housing 302. Therefore, for the flow sensor, it is desirable that the relationship of the degree of crystallinity of thermoplastic resin constituting the housing 302>degree of crystallinity of thermoplastic resin constituting the covers 303, 304 holds.

Various additives, for example, stabilizers (antioxidants, ultraviolet absorbers, and heat stabilizers), crystallizing nuclear materials, fire retardants and the like may be added to a crystalline resin forming the covers 303, 304 and the housing 302 of the flow sensor. However, the covers 303, 304 need to avoid containing any material contributing to the fall of the transmittance if possible. On the other hand, the housing 302 desirably contains a coloring agent that absorbs laser light, for example, carbon black. In view of laser welding of the covers 303, 304 and the housing 302, materials of the cover 303, 304 and the housing 302 desirably does not contain any mold releasing agent. Alloy materials of non-crystalline resin to be added to a crystalline resin constituting the covers 303, 304 are materials whose glass transition temperature is 80° C. to 120° C. such as polystyrene (PS), acrylonitrile styrene (AS), acrylonitrile butadiene styrene copolymer (ABS), polymethyl methacrylate (PMMA), cycloolefin polymer (COP), cycloolefin copolymer (COC), and polyvinyl chloride (PVC) and alloy materials to be added to a resin constituting the housing 302 include, in addition to alloy materials to be added to the covers 303, 304, polycarbonate (PC), modified polyphenylene ether (mPPE), polyether-imide (PEI), polyarylate (PAR), polysulfone (PSF), and polyether sulfone (PES). While at least one of alloy materials of non-crystalline resin to be contained in the covers 303, 304 is desirably set to 80° C. to 120° C., not only one alloy material, but also other alloy materials having crystallinity may also be contained. This also applies to the housing 302.

In the present invention described above, laser welding of the covers 303, 304 and the housing 302 has been described in detail, but similar effects such as quality guarantee based on the appearance and identification of the usage environment based on discoloring can be obtained by using, in addition to laser welding, joining using an adhesive or other welding (thermal welding, vibration welding, and ultrasonic welding).

Also, the present invention can be used for application of products other than the thermal flow sensor 300 and can be adopted for laser welding of general thermoplastic resins. Thermoplastic resins include, in addition to those mentioned above, polyethylene (PE), polypropylene (PP), polyoxymethylene (POM), polyethylene terephthalate (PET), polytrimethylene terephthalate (PTT), polyethylene naphthalate (PEN), polyether ether ketone (PEEK), liquid crystalline polymer (LCP), and polytetrafluoroethylene (PTFE). Non-crystalline resins contained as alloy materials include the above materials. Thermoplastic resins containing inorganic substances such as glass fiber or special additives are also included. The present invention can be applied not only to thermoplastic resins as main materials, but also to epoxy or acrylic thermoset resins having a relatively high transmittance.

In the foregoing embodiments, the divided embodiments are described, but each divided embodiment is not unrelated to each other and one divided embodiment is related to a portion or all of modifications of another divided portion.

REFERENCE SIGNS LIST

24 Exhaust gas
30 Measured gas
110 Internal combustion engine
112 Engine cylinder
114 Engine piston
116 Intake valve
118 Exhaust valve
122 Air cleaner
124 Main passage
126 Throttle body
128 Intake manifold
132 Throttle valve
144 Throttle angle sensor
146 Rotation angle sensor
148 Oxygen sensor
152 Fuel injection valve
154 Ignition plug
156 Idle air control valve
200 Control apparatus
300 Thermal flow sensor
302 Housing
303 Front cover
304 Rear cover
305 External connection unit
306 Sub-passage groove
307 Housing protruding portion for laser welding
310 Measuring unit
312 Flange
320 Terminal connection unit
322 Protective portion
324 Ejecting pin
326 Insertion hole
343 Entrance
350 Entrance
351 Entrance groove
352 Exit
353 Exit groove
356 Protruding portion
361 External terminal inner end
380 Protruding portion
381 Protruding portion
382 Cavity portion
390 Laser welded portion
391 Neighboring portion of the laser welded portion
392 Fine irregularities
400 Circuit package
412 Connection terminal
436 Flow rate detector
452 Temperature detector
500 Circuit chamber
501 Sub-passage

The invention claimed is:

1. A flow sensor comprising:
a sub-passage constituting a measurement channel by taking in a measured fluid from an opening;
a flow rate detector arranged inside the sub-passage to measure a flow rate of the measured fluid;
a housing including a circuit chamber that is isolated from the sub-passage to house electronic components that drive the flow rate detector; and
a resin cover joined to the housing to airtightly seal the sub-passage and the circuit chamber from an outside air, wherein
a joining portion formed on the housing and a joining portion formed on an inner surface of the cover are joined by laser welding,
a main material of the cover is a crystalline resin and contains at least one non-crystalline material and the cover is configured to undergo a change in color based on at least one of a temperature and an amount of elapsed time, and
a degree of crystallinity of a crystalline resin constituting the main material of the cover opposite to a flow rate detector made of Si elements is made larger than a degree of crystallinity of a crystalline resin constituting a material of an other cover on a rear side.

2. The flow sensor according to claim 1, wherein a resin material of a region of the joining portion formed on an inner surface of the cover and a neighboring portion has an average transmittance of 35% or more for light of a wavelength of 450 nm to 1100 nm.

3. The flow sensor according to claim 2, wherein a color of the resin material of a region corresponding to the joining portion of the cover satisfies lightness L* <75 and chroma C*<10 in an L*a*b color system.

4. The flow sensor according to claim 3, wherein a glass transition temperature of the material contained in the resin material of the cover is 80° C. to 120° C.

5. The flow sensor according to claim 1, wherein a protruding portion formed on the housing and the joining portion formed on the inner surface of the cover are joined by using an adhesive, instead of the laser welding.

6. The flow sensor according to claim 1, wherein a transmittance of the main material of the cover in a region of a neighboring portion of a joining portion to the housing is smaller than the transmittance of the main material of the cover in the region of the joining portion to the housing.

7. The flow sensor according to claim 1, wherein a thickness of the cover of a region of a neighboring portion of a joining portion to the housing is larger than a thickness of the cover in a region of the joining portion to the housing.

8. The flow sensor according to claim 1, wherein a gap is formed between the cover and the housing in a region of a neighboring portion of a joining portion of the cover and the housing.

9. The flow sensor according to claim 1, wherein a glass transition temperature of a material contained in a resin material of the cover is made equal to or less than a glass transition temperature of a material contained in a resin material of the housing.

10. The flow sensor according to claim 1, wherein a content of a glass material contained in the resin material of the cover is made equal to or less than a content of a glass material contained in the resin material of the housing.

11. The flow sensor according to claim 1, wherein a degree of crystallinity of a crystalline resin constituting a material of the housing is larger than the degree of crystallinity of the crystalline resin constituting the main material of the cover.

12. The flow sensor according to claim 1, wherein an elastic modulus of a material of the housing is larger than an elastic modulus of the main material of the cover.

13. The flow sensor according to claim 1, wherein a plurality of covers constituting the sub-passage is included and at least a plurality of different materials is used.

14. The flow sensor according to claim 1, wherein a glass transition temperature of a material contained in a material of a cover opposite to the flow rate detector made of Si elements is larger than a glass transition temperature of a material contained in a material of an other cover on a rear side.

15. A flow sensor comprising:
a sub-passage constituting a measurement channel by taking in a measured fluid from an opening;
a flow rate detector arranged inside the sub-passage to measure a flow rate of the measured fluid;
a housing including a circuit chamber that is isolated from the sub-passage to house electronic components that drive the flow rate detector; and
a resin cover joined to the housing to airtightly seal the sub-passage and the circuit chamber from an outside air, wherein
a joining portion formed on the housing and a joining portion formed on an inner surface of the cover are joined by laser welding,
a main material of the cover is a crystalline resin and contains at least one non-crystalline material and the cover is configured to undergo a change in color based on at least one of a temperature and an amount of elapsed time, and
a glass transition temperature of a material contained in a material of a cover opposite to the flow rate detector made of Si elements is larger than a glass transition temperature of a material contained in a material of an other cover on a rear side.

* * * * *